United States Patent Office 3,493,573
Patented Feb. 3, 1970

3,493,573
DIMETHYL XANTHINE DERIVATIVES AND
PRODUCTION THEREOF
Maurice Joullie, Saint-Germain-en-Laye, Michel Laurre, Chatillon-sous-Bagneus, and Gabriel Maillard and Pierre Muller, Paris, France, assignors to Recherches Pharmaceutiques et Scientifiques, Paris, France, a company of France
No Drawing. Continuation-in-part of application Ser. No. 435,319, Feb. 25, 1965. This application July 31, 1967, Ser. No. 657,056
Claims priority, application France, Feb. 27, 1964, 965,388; July 31, 1964, 983,740
Int. Cl. C07d 57/14; A61k 27/00
U.S. Cl. 260—253                                    9 Claims

ABSTRACT OF THE DISCLOSURE

The compound 7 - (p-dimethylamino-benzyl)-1,3-dimethyl xanthine and its acid addition and quaternary ammonium salts which are useful as a respiratory analeptic in cases of depression of the bulbar respiratory center, as a cardiotonic and as a coronary vaso-dilator. The compound may be prepared by reacting a p-dimethylamino benzyl halide with 1,3-dimethyl xanthine.

---

This application is a continuation-in-part of copending application Ser. No. 435,319, filed Feb. 25, 1965 (now abandoned).

This invention relates to dimethyl xanthine derivatives, their preparation and, in particular, provides a new chemical compound, 7-(p-dimethylamino-benzyl)-1,3-dimethyl xanthine, of the following formula:

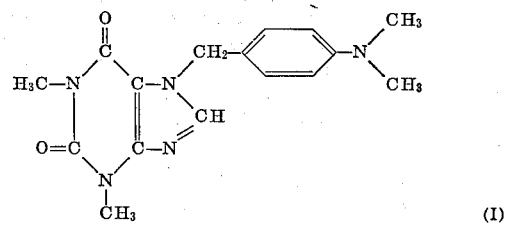

(I)

The invention also includes the acid addition and quaternary ammonium salts of the above compound.

The above compound may be prepared by reacting a p-dimethylamino benzyl halide (for example the chloride) or a salt thereof (particularly a hydrogen halide salt thereof, such as a hydrochloride) with 1,3-dimethyl xanthine (theophylline) or an alkali metal derivative thereof (for example the sodium derivative).

The reaction is preferably carried out in a polar solvent such as dimethyl formamide, and preferably also in the presence of a hydrogen halide acceptor, e.g. an organic base such as pyridine or triethylamine.

Furthermore, subsequent to the filing of the aforesaid copending application, Ser. No. 435,319, (now abandoned)) to which this is a continuation-in-part, it was found by others, namely Messrs. Quevauviller, Joullie, Lakah, Maillard and Muller (which includes three of the inventors named herein), that if the reaction is carried out in dimethyl-formamide, not only is the above named compound produced (the 7-isomer) but also 8-(p-dimethylaminobenzyl)-1,3-dimethyl xanthine (the 8-isomer) is produced in admixture with the 7-isomer. This has been established by thin layer chromatography. The 8-isomer corresponds to the following formula:

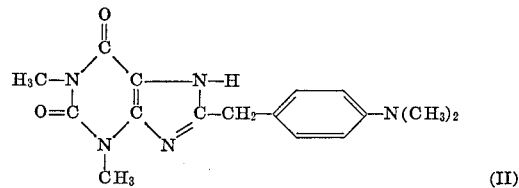

(II)

The content of the 8-isomer in said mixture may vary over a wide range, viz from 0.5 to 46% by weight according to operating conditions. While the 7-isomer corresponding to the above Formula I has a melting point of 185.5° C., the 8-isomer has a melting point of 260–261° C. The solubilities of the 7-isomer and the 8-isomer are substantially identical. The structures shown in Formulae I and II have been confirmed by IR spectra and by the study of nuclear magnetic resonance.

It may be hypothesized that in *this* specific instance p-dimethylamino benzyl chloride by reason of its high reactivity behaves in an abnormal fashion towards a theophylline alkali metal salt, and is capble of reacting in two ways:

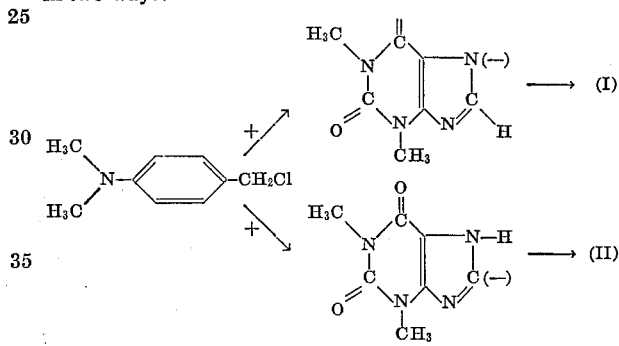

As the 7-isomer and 8-isomer have fairly similar properties, it is difficult to isolate one from their mixture obtained, say by reacting a p-dimethylamino-benzyl halide with 1,3-dimethyl xanthine (theophylline). However, by dissolving the mixture in nitrobenzene at a temperature in the vicinity of the boiling point of nitrobenzene, it has been possible to cause the 8-isomer to crystallize from the solution and eventually to obtain a solution from which the 7-isomer can be isolated by evaporating the solvent. Also, by selective dissolution in sodium hydroxide the 8-isomer can be separated from the 7-isomer.

The finding that reacting a p-dimethylamino-benzyl halide with 1,3-dimethyl xanthine (theophylline) produces both 7- and 8-(p-dimethylamino-benzyl)-1,3-dimethyl xanthines and the techniques for their separation were the discoveries of Messrs. Quevauviller, Joullie, Lakah, Maillard and Muller, and the inventors herein make no claim to a method of separation.

Quaternary ammonium salts of 7- and 8-(p-dimethyl-aminobenzyl)-1,3-dimethyl xanthine can be obtained by the action of an alkyl or aralkyl ester on the free base and the reaction may be carried out in a suitable inert medium, for example in an acetone medium. The acid addition salts can be obtained simply by neutralization of the base with an acid in an aqueous medium containing an excess of the base, excess base being removed after the acid treatment by filtration. Examples of pharmaceutically acceptable acid addition salts and quaternary ammonium salts of the 7- and 8-isomers which have been prepared in admixture are the hydrochloride, acid sulphate, neutral sulphate and camphosulphonate and the quaternary ammonium salts obtained by reactig the above mixture with methyl bromide, benzyl bromide and methyl camphosulphonate.

It will be appreciated that the acid addition salts are salts formed with the nitrogen atom of the amino group which is a substituent in the benzene ring. The quaternary ammonium salts are also formed with this nitrogen atom and have the general formula:

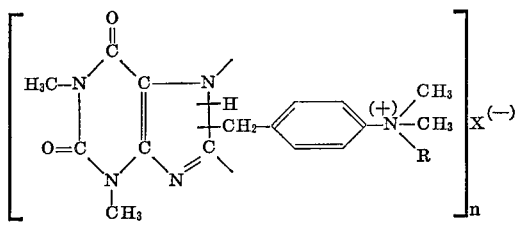

wherein R represents an alkyl radical or an aralkyl radical, X represents the anion of an acid and $n$ is a number equal to the basicity of the acid.

Examples of pharmaceutically acceptable acid addition salts and quaternary ammonium salts of the 7-isomer which have been prepared are the hydrochloride, acid sulfate, camphosulphonate, methobromide, bromobenzylate and methylcamphosulphonate. Preparation of these acid addition salts and quaternary ammonium salts are as explained above.

The following examples illustrate the preparation of the 7- and 8-isomers in admixture and the acid addition and quaternary ammonium salts thereof.

EXAMPLE 1

(a) p-Dimethylamino benzyl alcohol 80 g. of p-dimethylamino benzaldehyde were dissolved in 600 ml. of anhydrous ethanol and hydrogenated under a pressure of 100 kg. per sq. cm. in the presence of a Raney nickel catalyst and a few drops of caustic soda solution. Hydrogenation was carried out at ambient temperature for 2½ to 3 hours. After filtration to remove the catalyst, the alcohol was distilled off in vacuo and the residue distilled. Boiling point=104.5–105.5° C., at 0.8–0.9 mm. pressure; melting point=24–25° C.; refractive index $[n]_D^{18.5°\ C.}=1.5759$; yield: 82–83%.

Analysis.—For $C_9H_{13}ON$. Calculated: C, 71.51%; H, 8.61%; N, 9.27%. Found: C, 71.33%; H, 8.68%; N, 9.28%.

(b) Hydrochloride of p-dimethylamino benzyl chloride 67 g. of p-dimethylamino benzyl alcohol were dissolved in 270 ml. of concentrated hydrochloric acid (d.=1.19). The temperature of the mixture was raised to 100° C. on a water bath and treated at that temperature for 2½ hours, with a stream of anhydrous hydrogen chloride. The acid solution was removed in vacuo in a rotary evaporator. The residue is precipitated from anhydrous ether; it melts at 110.6° C.

Analysis.—For $C_9H_{13}NCl_2$. Calculated: C, 52.40%; H, 6.31%; N, 6.79%; Cl, 34.48%. Found: C, 52.14–52.19%; H, 6.39–6.44%; N, 6.89–7.00%; Cl, 34.48–34.28%.

(c) Mixed 7- and 8-(p-dimethylamino-benzyl)-1,3-dimethyl xanthines 9.2 g. of sodium were dissolved in 1200 ml. of anhydrous ethanol or methanol. After disappearance of the metal 72 g. of theophylline (1,3-dimethyl xanthine) were added at a temperature of 45° C. and the mixture was heated under reflux for an hour and a half.

The alcohol was removed in vacuo and the powdery product was protected from moisture and kept in a nitrogen atmosphere. The yield was quantitative.

40 g. of the sodium theophylline (sodium 1,3-dimethyl xanthine) thus prepared were suspended in 280 ml. of anhydrous dimethyl formamide in the presence of an hydrogen chloride acceptor (15.7 g. of pyridine or 20 g. of triethylamine). A solution of 40.8 g. of p-dimethylamino-benzyl chloride hydrochloride dissolved in 145 ml. of dimethyl formamide were added over a period of 20 minutes at ambient temperature and with agitation. Agitation was continued for 4 hours. The amine hydrochloride and the sodium chloride formed in the reaction were removed by filtration and the filtrate was dried in vacuo in a rotary evaporator (water bath temperature 40–45° C.). The mixture was washed twice with benzene to eliminate the traces of dimethyl formamide. The solid product so obtained was washed with water and was purified by dissolution in 4 N hydrochloric acid, followed by precipitation with 4 N ammonia. The product was washed with distilled water and can be recrystallised from a mixture of 70 ml. of ethanol and 30 ml. of chloroform. Yield: 46%. Melting point 209.5–210° C.

Analysis.—For $C_{16}H_{19}O_2N_5$. Calculated: C, 61.34%; H, 6.07%; N, 22.36%. Found: C, 60.89%; H, 6.30%; N, 22.35%.

EXAMPLE 2

The hydrochloride of mixed 7- and 8-(p-dimethyl-aminobenzyl)-1,3-dimethyl xanthines 10 g. of the product of Example 1 were suspended in a mixture of 50 ml. of water and 15 ml. of 4 N hydrochloric acid. A clear solution was obtained which was treated with activated charcoal and dried after filtration. The yield of the hydrochloride is theoretical and the product is substantially non-hygroscopic. Melting point: 203–204° C. (Maquenne block); pH of 2% aqueous solution: 1.6.

Analysis.—For $C_{16}H_{20}O_2N_5Cl2H_2O$. Calculated: C, 49.81%; H, 6.27%; N, 18.15%. Found: C, 50.20%; H, 6.04%; N, 18.01%.

EXAMPLE 3

The acid sulphate of mixed 7- and 8-(p-dimethyl-aminobenzyl)-1,3-dimethyl xanthines 1 ml. of a solution containing 15.7 g. of sulphuric acid per 100 ml. of water was added to a suspension of 0.5 g. of the base obtained in Example 1 in 30 ml. of water. The clear solution was treated with activated charcoal and dried in vacuo. Melting point: 138° C. (Maquenne block: difficult to determine); pH of 2% aqueous solution: 1.5.

Analysis. — For $C_{16}H_{21}O_6N_5SH_2O$. Calculated; C, 44.76%; H, 5.36%; N, 16.31%; S, 7.46%. Found: C, 45.38–45.58%; H, 5.30–5.38%; N, 16.22–15.99%; S, 7.66%.

EXAMPLE 4

The neutral sulphate of mixed 7- and 8-(p-dimethylaminobenzyl)-1,3-dimethyl xanthines The neutral sulphate was prepared in the same way as described in Example 3 except that 1 gram of the base was treated in suspension in 10 ml. of water with 1 ml. of a solution containing 15.7 grams of sulphuric acid per 100 ml. of water. Melting point: 149.5° C. (Maquenne block: difficult to determine); pH of 2% solution: 2.

Analysis.—For $C_{32}H_{40}O_8N_{10}S3H_2O$. Calculated: C, 49.36%; H, 5.91; N, 17.99%. Found: C, 49.40–49.30%; H, 6.05–6.00%; N, 18.01–17.95%.

EXAMPLE 5

The camphosulphonate of mixed 7- and 8-(p-dimethylaminobenzyl)-1,3-dimethyl xanthines 5 g. of the product obtained in Example 1 were crushed with 3.7 g. of camphosulphonic acid. The powdered mixture was taken up in 700 ml. of distilled water and agitated for 15 minutes. The solution was filtered and dried in vacuo. The resulting product was taken up in 40 ml.

of methylene chloride. The solution was filtered cold and re-dried. Melting point: 123–124° C. (Maquenne block: difficult to determine); pH of 2% aqueous solution: 3.3.

*Analysis.*—For $C_{26}H_{35}O_6N_5S3H_2O$. Calculated: C, 52.09%; H, 6.85%; N, 11.68%; S, 5.34%. Found: C, 52.00%; H, 6.36%; N, 11.43%; S, 5.76%.

EXAMPLE 6

The trimethylammonium bromide of mixed 7- and 8-(p-dimethylamino-benzyl)-1,3-dimethyl xanthines 1.8 g. of the product obtained in Example 1 were dissolved hot in 240 ml. of acetone. A solution of 2.75 g. of methyl bromide in 25 ml. of acetone was added to the acetone solution. The mixed solutions were heated in a sealed tube on a water bath at 100° C. for 15 hours. The precipitate was filtered, taken up in 10 ml. of distilled water and treated with activated charcoal. After filtration, the solution was dried in vacuo in a rotary evaporator (water bath temperature 48° C.). Yield 64%; pH of 2% aqueous solution: 4.6; melting point: 209° C. (decomposition: Büchi apparatus; softening at 206° C.).

*Analysis.*—For $C_{17}H_{22}O_2N_5Br$. Calculated: C, 50.00%; H, 5.39%; N, 17.15%; Br, 19.60%. Found: C, 48.89%; H, 5.70%; N, 17.05%; Br, 19.34–19.79%.

EXAMPLE 7

The dimethyl-benzyl ammonium bromide of mixed 7- and 8-(p-dimethylamino-benzyl)-1,3-dimethyl xanthines 11.5 g. of the product obtained in Example 1 were dissolved in 1400 ml. of anhydrous acetone containing 10 ml. of rectified benzyl bromide (2.3 times the theoretical quantity). The mixture was kept at reflux temperature for 20 hours. The product was filtered, washed with ether, taken up in 100 ml. of distilled water and treated with a little activated charcoal. The solution was filtered and dried and the product was dried in vacuo in the presence of phosphorus pentoxide. Yield: 51%; melting point: 112.5–114° C. (Maquenne block: difficult to measure); pH of the 2% aqueous solution: 5.4.

*Analysis.*—For $C_{23}H_{26}O_2N_5Br$. Calculated: C, 57.02%; H, 5.37%; N, 14.46%; Br, 16.53%. Found: C, 56.88%; H, 5.44%; N, 14.42%; Br, 16.64%.

EXAMPLE 8

The trimethylammonium camphosulphonate of mixed 7- and 8-(p-dimethylamino-benzyl)-1,3-dimethyl xanthines 3 g. of the product obtained in Example 1 were dissolved in 400 ml. of anhydrous acetone containing 3.5 g. of methyl camposulphonate. The mixture was heated under reflux for 20 hours and the product was filtered, rinsed with acetone, taken up in 20 ml. of distilled water and treated with activated charcoal. The filtrate was dried in vacuo. Yield: 56%; melting point: 183–184° C. (Maquenne block); pH of the 2% solution: 4.5.

*Analysis.*—For $C_{27}H_{37}O_6N_5S$. Calculated: C, 57.97%; H, 6.62%; N, 12.52%; S, 5.72%; O. Found: C, 57.74%; H, 6.91%; N, 12.37%; S, 5.44%; O, 5.33%.

The following example illustrates the separation of the 7- and 8-isomers in admixture as obtained in accordance with Example I(c).

EXAMPLE 9

6.3 g. of the isomer mixture produced in a manner similar to that described in Example 1 were placed in a beaker with 100 ml. of sodium hydroxide, 2 normal, and stirred for 2.30 hours at ambient temperature. The suspension was centrifuged, and the solid thus obtained rinsed with distilled water until it was neutral. Thin layer chromatography showed that the solid contained traces of the 8-isomer.

The solid was again treated with 50 ml. of sodium hydroxide, 2 normal for 2.30 hours, centrifuged and rinsed with distilled water. Only one spot stain was found when the solid was subjected to thin layer chromatography. The quantity of solid recovered weighed 1.8 g., a yield of 41%, and a melting point of 180° C.

The alkaline solutions were treated without heating by adding concentrated hydrocloric acid up to pH 6. The 8-isomer precipitated, was centrifuged and rinsed until it was free from chlorine ions. The solid recovered weighed 2.6 g., a yield of 59%, and a melting point of 265° C.

The total amount of isomers, 1.8+2.6=4.4 g., recovered indicates a yield of 70%.

The following examples illustrate the preparation of the acid addition salts of 7-(p-dimethylamino-benzyl)-1,3-dimethyl xanthines.

EXAMPLE 10

(a) Hydrochloride 7-(p-dimethylamino-benzyl)-1,3-dimethylxanthine (250 g.) was suspended in water (3.5 litres) at 5° C. and 50% hydrochloric acid (250 ml.) was added thereto. The colourless solution thus obtained was concentrated in vacuo (15 mm.) by means of a rotary evaporator (water-bath at 30° C.) until four-fifths of the initial volume were removed. The precipitated product was centrifuged, any contact with iron being avoided.

The product was dried in an argon atmosphere in darkness. A first crop corresponding to a yield of 80% was thus obtained. From the mother water a second crop of less pure hydrochloride could be collected. M.P. 167–168° C. Köfler block).

*Analysis.*—For $C_{16}H_{19}O_2N_5 \cdot 2H_2O \cdot HCl$. Calculated: C, 49.81%; H, 6.27%; N, 18.15%. Cl, 9.19%. Found: C, 49.76%; H, 6.32%; N, 18.16%; Cl, 9.20%.

(b) Acid sulfate

Sulfuric acid 1.01 N (15.9 ml.) was added to a suspension of 7-p-dimethylamino benzyl) theophylline (2.5 g.) in water (30 ml.) The clear, colourless solution was dried in vacuo as above. The yield was 100%; M.P. 232° C. (Köflol block).

*Analysis.*—For $C_{16}H_{19}O_2N_5 \cdot SO_4H_2$. Calculated: C, 46.71%; H, 5.14%; N, 17.02%; S, 7.79%. Found: C, 46.67%; H, 5.38%; N, 17.15%; S, 7.87%.

(c) Camphosulfonate 7-(p-dimethylamino-benzyl) theophylline (2.5 g.) was dissolved in water (50 ml.) to which dl-camphosulfonic acid (1.85 g.) was added. A portion of the base (0.37 g.) remained undissolved. The solution was filtered and dried in vacuo, excess acid being removed by means of five successive grindings in acetone. M.P. 187° C. (Köfler block).

*Analysis.*—For $C_{26}H_{35}O_6N_5S$. Calculated: C, 57.23%; H, 6.465%; N, 12.83%; S, 5.88%. Found: C, 57.19%; H, 6.72%; N, 12.77%; S, 5.80%.

(d) Methobromide 7-(p-dimethylamino-benzyl) theophylline (2 g.) was dissolved in anhydrous acetone to which a solution (10 ml.) of methyl bromide (93 g.) in acetone (600 ml.) was added. The mixture was placed in a sealed tube and heated on a water-bath to 100° C. for 15 hours. The product thus formed was centrifuged, washed with ether, taken up in water, treated with Norit black and filtered. The colourless solution was evaporated to dryness in vacuo on a water-bath at 30° C. M.P. above 260° C.

*Analysis.*—For $C_{17}H_{22}O_2N_5Br \cdot H_2O$. Calculated: C, 47.89%; H, 5.63%; N, 16.43%; Br, 18.74%. Found: C, 47.78%; H, 5.53%; N, 16.50%; Br, 18.69%.

(e) Methiodide

The procedure was the same as under (d); the methiodide has a melting point of 194–195° C. (Köfler).

*Analysis.*—For $C_{17}H_{22}O_2N_5I$. Calculated: C, 44.84%; H, 4.88%; N, 15.38%; I, 27.87%. Found: C, 44.59%; H, 4.99%; N, 15.57%; I, 27.83%.

(f) Methylcamphosulfonate

Same procedure as under (d). M.P. 247° C. (Köfler).

Analysis.—For $C_{27}H_{37}O_6N_5S$. Calculated: C, 57.94%; H, 6.66%; N, 12.51%; S, 5.73%. Found: C, 57.95%; H, 6.71; N, 12.48%; S, 5.61%.

(g) Bromobenzylate 7-(p-dimethylamino-benzyl) theophylline (2 g.) was disolved in anhydrous acetone (200 ml.). Benzyl bromide (1.5) g.) rectified in vacuo was added and the solution refluxed for 15 hours. The precipitate was centrifuged, washed with ether, taken up in water and treated with Norit black. The solution was filtered and evaporated to dryness on a water-bath at 30° C. M.P. 189° C. (Köfler).

Analysis.—For $C_{23}H_{26}O_2N_5Br \cdot H_2O$. Calculated: C, 54.99%; H, 5.62%; N, 13.94%; Br, 15.91%. Found: C, 54.86%; H, 5.42%; N, 14.00%; Br, 15.87%.

Examples for the preparation of the quaternary ammonium salts of 7- (p-dimethylamino-benzyl)-1,3-dimethyl xanthine would substantially follow the description in Examples 6 through 8 for the 7-isomer and 8-isomer in admixture.

PHARMACOLOGICAL AND PHYSIOLOGICAL PROPERTIES OF MIXED 7- AND 8-(P-DIMETHYLAMINO - BENZYL) - 1,3 - DIMETHYL XANTHINES

For convenience's sake, the new p-dimethylamino benzyl xanthine compound was studied in admixture with the 8-isomer in the form of their hydrochlorides (hereinafter referred to as L J 278); in most cases the study was carried out together with a comparision with the properties of theophylline (1,3-dimethylxanthine).

Theophylline was solubilized with sodium anisate and the doses indicated below are based on the amount of theophylline employed. L J 278 is soluble in distilled water in physiological serum at a concentration of 9 ml. per litre. The doses indicated below are based on the hydrochloride.

In this work a comparison was made on the basis of the weight of substance emyployed; i.e. comparing the properties of the same weight of theophylline base and L J 278 and not those of the same molar quantities (1 g. of theophylline base is approximately equivalent to 1.795 g. of p-dimethylamino-benzyl - 1,3 - dimethyl xanthine base).

TOXICITY

This was measured in male mice; the DL 50 was calculated by the Kärber and Behrens method; the following results were obtained:

| Method of Administration | L J 278,[1] mg./kg. | Theophylline, mg./kg. |
| --- | --- | --- |
| Intravenous | 82.5 | [2] 120 |
| Subcutaneous | 630 | [2] 200 |
| Oral | 660 | 440 |

[1] Because of the acidity of its aqueous solutions, L J 278 administered intravenously is a little more toxic than theophylline; on the other hand it is less toxic when administered orally and much less toxic when administered subcutaneously.
[2] Literature.

ACTION ON CENTRAL NERVOUS SYSTEM

For equivalent doses of theophylline base, the administration of L J 278 to a normal mouse in a dosage of 100 mg./kg. did not result in the characteristic excitation effect of theophylline (100 mg./kg.).

In mice, L J 278 administered subcutaneously in a dose of 100 mg./kg. to mice which had intra-peritoneally received 40 mg./kg. of mebubarbital (threshold dosage resulting in sleep at a maximum of 15 minutes after injection and terminating after one hour) causes a slight hypnosis potentialisation as regards intensity and duration; under the same conditions in the presence of theophylline, hypnosis dies away very rapidly.

A dose of 100 mg./kg. of L J 278 administered orally in mice 30 minutes before subcutaneous injection of 20 mg./kg. of amphetamine gives a diminution or suppression of amphetamine excitation, this result not being found with theophylline administered in the same way and in the same dose.

ACTION ON THE AUTONOMOUS NERVOUS SYSTEM

Intravenous administration in doses of 5, 10 and 20 mg./kg. of L J 278 to a chloralised dog established that the new compound was very slightly ganglioplexic and has a low spasmolytic power.

ACTION ON CARDIO-VASCULAR SYSTEM

Applied to the coronary vessels of isolated rabbit heart by the Langendorff method, L J 278 exhibited a coronary vasodilatory power greater than that of theophylline when added in Tyrode's solution at the level of the perfusion cannula. The mean percentage increase in blood flow is given below for two different dosages.

1 minute after injection:

| Dosage | L J 278, percent | Theophylline, percent |
| --- | --- | --- |
| 1 mg | 45 | 22 |
| 2 mg | 59 | 25 |

The effect of L J 278 is therefore approximately twice as much as that of theophylline.

ACTION ON RESPIRATORY SYSTEM

L J 278 tried on rabbits (morphine-depressed respiration) chloralised dogs and guinea pigs (bronchial spasm) has both an analeptic respiratory action and a spasmolytic effect on bronchial constriction produced by histamine, its properties in this respect being similar to those of theophylline.

ACTION ON MUSCULAR FIBRE

The effects on isolated rat duodenum, isolated guinea pig gall bladder and isolated guinea pig ileum showed that with regard to smooth fibre L J 278 had a spasmolytic power almost four times greater than that of theophylline. With regard to smooth fibre L J 278 had a spasmolytic power almost four times greater than that of theophylline. With regard to striated fibre it exhibited a curarising power.

ACTION ON SECRETIONS

Diuresis in rabbits, and particularly dogs, is increased; it is approximately twice its normal value in the cloralised dog after administration of 25 mg./kg. of L J 278 intraduodenally.

In the same dosage and for the same method of administration L J 278 gives a choleretic action practically equivalent to that of theophylline.

The pharmacological and physiological properties of the 7-isomer alone are found to be substantially the same as the above described properties of the mixture of 7- and 8-isomers.

The compound of the invention, particularly in the form of the salts described in Examples 2–5 and 10(a)–(c), is of use principally as a respiratory analeptic in cases of depression of the bulbar respiratory centre (for example in intoxication, dyspnoea and asthma), as a cardiotonic and as a coronary vaso-dilator. It can be used very widely in conventional theophylline indications, bearing in mind its absence of excitant effects on the central nervous system; it can be used particularly as a diuretic and to counteract smooth muscle fibre spasms (for example bronchial spasms, spasms of the gall ducts and of the Sphincter of Oddi, and ureteral spasms).

The invention therefore includes a chemotherapeutic composition comprising, as the active ingredient, 7-(p-dimethylaminobenzyl)-1,3-dimethyl xanthine or an acid addition or quaternary ammonium salt thereof together with a pharmaceutically-acceptable carrier. The compound of the invention is particularly suitable for administration by the oral or endorectal route in association with a suitable excipient and, if desired, together with one or more other active substances.

In the following description the compound of the invention is referred to by the shorter name, p-dimethylamino-benzyl-theophylline, or by its abbreviation, DMABT.

Some examples of suitable formulations are given below containing the free base DMABT.

(1) Oral administration (a) DMABT alone:  
    DMBAT _____ 0.100 G.  
Excipient sufficient to make up, 1 tablet.

The following three examples give a brief idea of the production of such preparations:

(1) Tablets: G.  
    DMABT _____ 0.100  
    Lactose _____ 0.125  
    Starch _____ 0.020  
    Magnesium stearate for one tablet _____ 0.005

These tablets are made simply by mixing the powders and compressing the same.

(2) Pills with an enteric coating—  
  (a) Gluten coating+gum lac, formula for one pill Core: G.  
    DMABT _____ 0.100  
    Lactose _____ 0.125  
    Starch _____ 0.020  
    Mg. stearate _____ 0.005  
Coating:  
    Gum lac _____ 0.015  
    Wheat gluten _____ 0.062

To make these pills, the core is first prepared simply by mixing the constituents and pressing them on a pressing machine.

The cores are then placed in a pill-making centrifuge and the gum lac (in a 30% solution in ethyl alcohol) followed by the gluten powder is introduced successively and in a number of increments by conventional methods.

After the coating has dried and tests have been carried out to check their disintegration in gastric medium and intestinal medium, the pills are completed by repeated applications of saccharose syrup.

(b) Cellulose acetophthalate coating:  
A varnish composed of an 8% cellulose acetophthalate solution is applied directly to the centrifuge on the above-described DMABT-containing cores. The amount of cellulose acetophthalate employed is approximately 10 mg. per pill. The varnished pills may be used in that form or coated with a layer of saccharose.

(c) DMABT-based formulations:  
DMABT may also be used in association with other active substances such as barbituric or diuretic substances.

Example (1): G.  
    DMABT _____ 0.10  
    Phenyl ethyl malonyl urea _____ 0.10  
Sufficient amount of excipient.

Example (2):  
    DMABT _____ 0.10  
    Theobromine _____ 0.10  
Sufficient amount of excipient.

As indicated above, these various tablet formulae can be given different coatings, more particularly an enteric coating.

The above formulations are not limitative. Like theophylline, DMABT may be associated with numerous other medicinal substances, more particularly ephedrine or antihistamines for the treatment of dyspnoea, with papaverine or trinitrine for the treatment of coronary disorders, with cardiotonic glucosides in myocardial disorders, with sparteine or quinidine in cardiac rhythm disorders, with cholagogues and choleretics in cases of bile dyspepsia, and with aspirin to reduce certain secondary effects of DMABT.

(2) Endorectal administation (a)  
Suppository formulae: G.  
    DMABT _____ 0.25  
Excipient sufficient to make up, 1 suppository.

(b)  
    DMABT _____ 0.25  
    Phenobarbital _____ 0.02  
Excipient sufficient to make up, 1 suppository.

(c)  
    DMABT _____ 0.30  
    Theobromine _____ 0.40  
    Valerian _____ 0.25  
Excipient sufficient to make up, 1 suppository.

The preparation of these various suppository formulae is quite conventional. The excipient is generally formed from fatty acid glycerides, for which there are numerous commercial preparations available (for example Imhausen excipient, *Suppocire* and *Massa estarinum*).

In the formulations set out above, the p-dimethylamino-benzyl theophylline may be used as such or, unless the contrary is stated, in the form of its acid addition or quaternary ammonium salts, particularly the salts described in Examples 2–5 and 10 (a)–(c).

Generally, in the case of the free base, p-dimethylamino-benzyl theophylline, the usual single doses are 50 to 500 mg., irrespective of the method of administration and the maximum dose 1500 mg. per 24 hours (in 3 or more batches) for adults. Smaller doses may be used for children or in the case where the DMABT is associated with another medicinal substance. The bottom limit is then 10 mg.

What we claim is:
1. Compounds of the group consisting of 7 - (p-dimethylamino - benzyl) - 1,3 - dimethyl - xanthine having the formula:

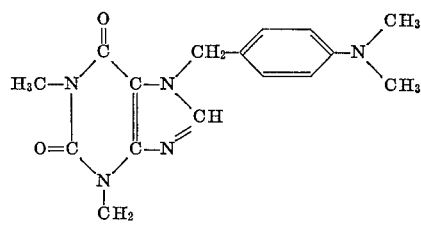

and pharmaceutically acceptable acid addition and quaternary ammonium salts thereof.

2. The hydrochloride of 7 - (p - dimethylamino-benzyl)-1,3-dimethyl-xanthine.

3. The acid sulphate of 7-(p-dimethylamino-benzyl)-1,3-dimethyl-xanthine.

4. The neutral sulphate of 7-(p-dimethylamino-benzyl)-1,3-dimethyl-xanthine.

5. The camphosulphonate of 7-(p-dimethylamino-benzyl)-1,3-dimethyl-xanthine.

6. A quaternary ammonium salt having the general formula:

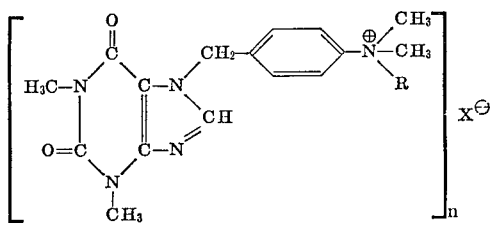

wherein R is a radical selected from the group consisting of methyl and benzyl radicals, X represents a pharmaceutically acceptable anion of an acid and $n$ represents a number equal to the basicity of the acid.

7. The trimethyl ammonium bromide of 7-(p-amino-benzyl)-1,3-dimethyl-xanthine.

8. The dimethyl-benzyl ammonium bromide of 7-(p-amino-benzyl)-1,3-dimethyl-xanthine.

9. The trimethyl ammonium camphosulphonate of 7-(p-amino-benzyl)-1,3-dimethyl-xanthine.

References Cited

UNITED STATES PATENTS 2,924,598  2/1960  Bestian _____ 260—253

ALEX MAZEL, Primary Examiner

ANNE MARIE T. TIGHE, Assistant Examiner

U.S. Cl. X.R.

260—256; 424—180, 253